United States Patent [19]
Watanabe

[11] Patent Number: 5,434,753
[45] Date of Patent: Jul. 18, 1995

[54] CAR STEREO HAVING SEPARATORS ENGAGED WITH GROOVES

[75] Inventor: Masaaki Watanabe, Saitama, Japan

[73] Assignee: Pioneer Electronic Corporation, Tokyo, Japan

[21] Appl. No.: 294,918

[22] Filed: Aug. 24, 1994

[30] Foreign Application Priority Data

Aug. 30, 1993 [JP] Japan .................. 5-46952 U

[51] Int. Cl.6 ............................. H05K 7/00
[52] U.S. Cl. .................. 361/814; 455/345; 455/347; 312/7.1
[58] Field of Search .......... 361/679, 724–728, 361/814; 455/344–349; 331/187; 312/7.1; 174/50, 52.1

[56] References Cited

U.S. PATENT DOCUMENTS 3,906,371 9/1975 Tsuji ........................ 361/814
5,036,432 7/1991 Uronen et al. ............ 361/814
5,222,007 6/1993 Suzuki et al. .............. 455/349

Primary Examiner—Bot L. Ledynh
Attorney, Agent, or Firm—Nikaido, Marmelstein, Murray & Oram

[57] ABSTRACT

A plurality of separators are formed on a connector member for separating contacts provided on said connector member so as to render these contacts to be space apart with one another. A plurality of grooves are formed on a plug member into which the separators formed on the connector member are inserted. Said contacts provided on the connector member and said contacts provided on the the plug member are adapted to be electrically connected by the engagement of said separators of the connector member with said grooves of the plug member.

4 Claims, 7 Drawing Sheets

PRIOR ART

PRIOR ART

CAR STEREO HAVING SEPARATORS ENGAGED WITH GROOVES

BACKGROUND OF THE INVENTION

The present invention relates to a car stereo generally provided on the dashboard of a motor vehicle, more particularly to a car stereo having a detachable grille.

With an increase in the use of sophisticated car stereo in recent years, there have been more and more theft concerning car stereo. Such theft are supposed to have happened due to a clear appearance of a grille having various operation pushbuttons which enables a thief to quickly recognize the existence of a car stereo. In order to prevent theft of a car stereo from increasing, a car stereo having a detachable grille has been developed and become commercially available. If a car driver releases the grille from the stereo body when leaving his car, the theft may be prevented since it is difficult to know there is a car stereo provided on the dashboard.

Figure 9:
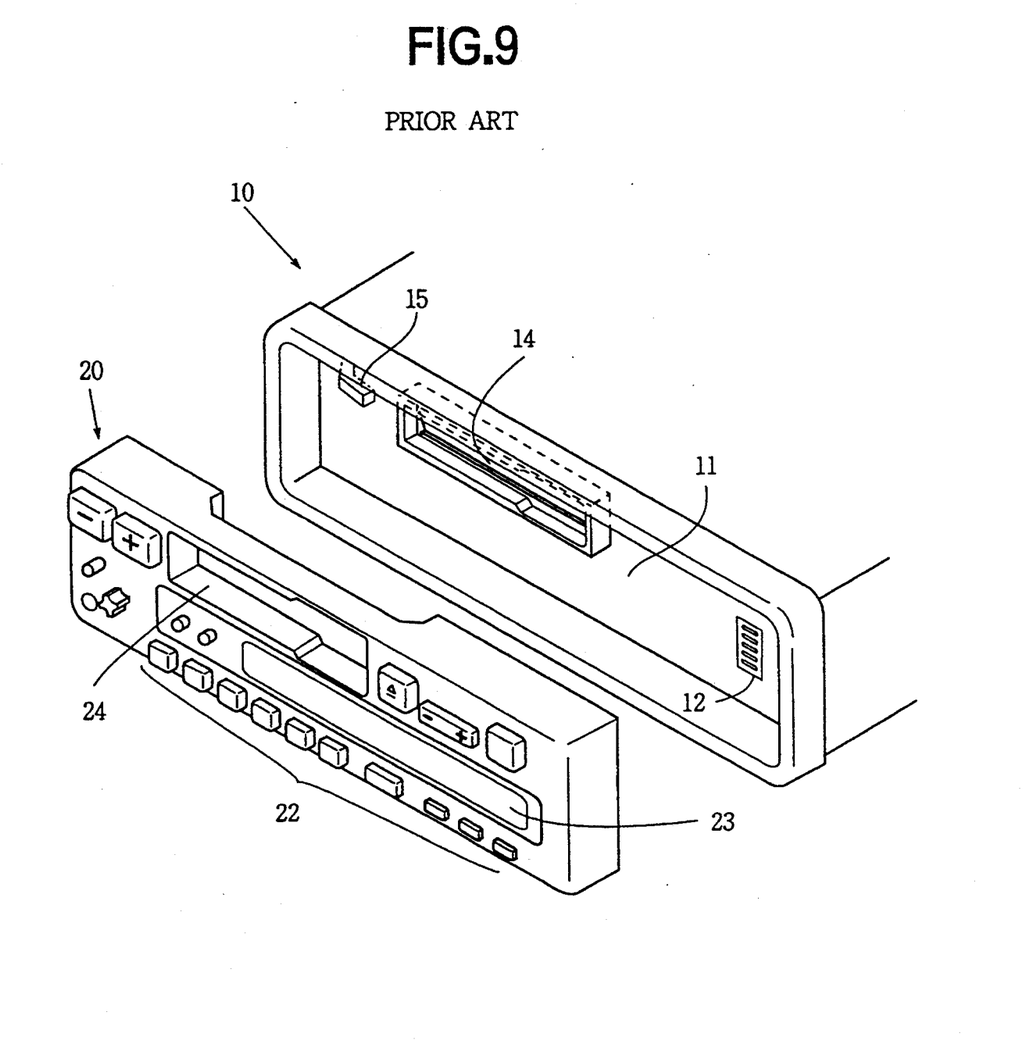
FIG. 9 is a perspective view showing a conventional car stereo using a conventional connector member and plug member, respectively.

FIG. 9 shows the above-mentioned conventional car stereo wherein a grille 20 having various operating pushbuttons is detachable from a stereo body 10. As shown in FIG. 9, the stereo body 10 has a recess 11 into which the grille 20 is mounted. The recess 11 is provided with a connector member 12 on the right hand side thereof, an elongated cassette opening 14 on nearly central portion thereof, and a detecting switch 15 on the left side of the opening 14. The detecting switch 15 is provided to detect whether or not the grille 20 is mounted on the stereo body 10.

Also, as shown in FIG. 9, the grille 20 has, on the front face thereof, a series of operating pushbuttons 22, display 23 for indicating various information such as time and a radio receiving frequency. On the upper portion of the front face of the grille 20, there is provided an elongated cassette opening 24 corresponding to and communicating with the elongated opening 14 formed on the recess 11 of the stereo body 10.

Figure 10:
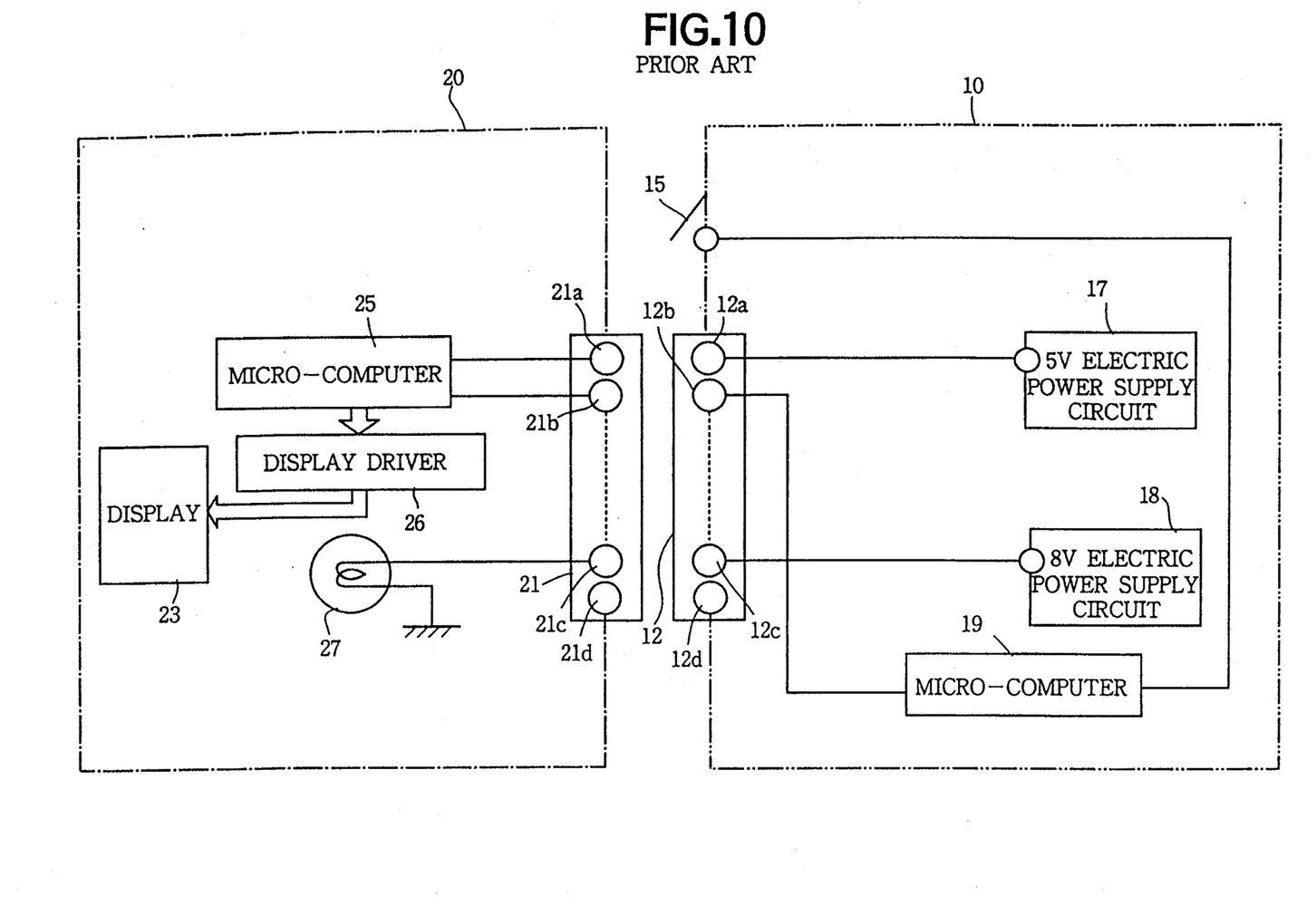
FIG. 10 is a view showing a circuit of the grille and the stereo body, involving the connector member and plug member used in a car stereo of both the present invention and prior art.

FIG. 10 shows an inner structures of the grille 20 and the stereo body 10 respectively and an electrical relationship between these two. As shown in FIG. 10, the connector member 12 is provided with various contacts including a contact 12a for obtaining 5 V electric power supply, a contact 12b for data input and output, a contact 12c for obtaining 8 V electric power supply, and an earth contact 12d. The contact 12a is connected to 5 V electric power supply circuit 17, and the contact 12c is connected to 8 V electric power supply circuit 18. The contact 12b is connected to a micro-computer 19.

Figure 11:
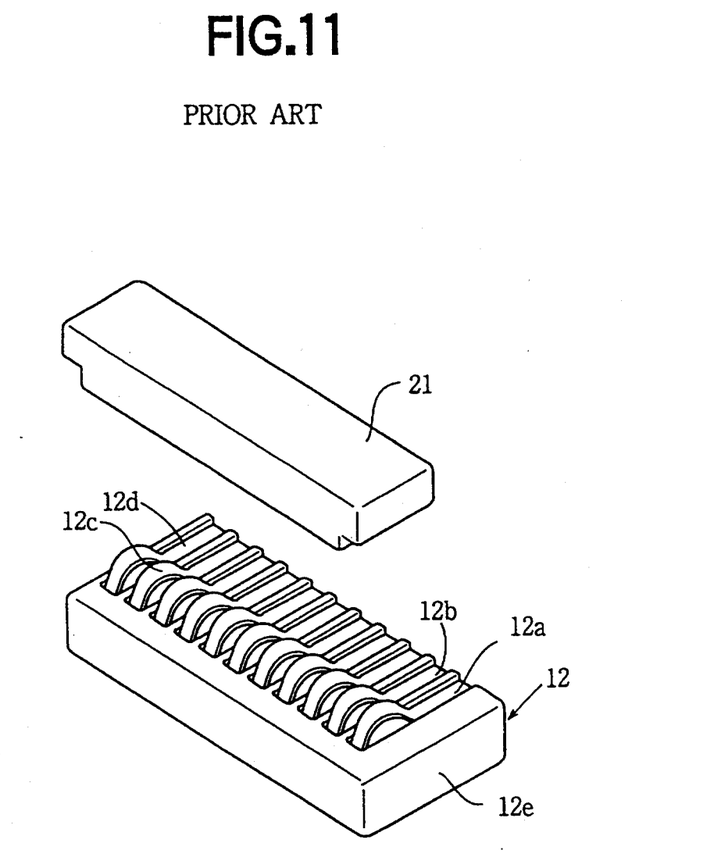
FIG. 11 is a perspective view showing a connector member and a plug member used in a conventional car stereo.

Also, as shown in FIG. 11, on the rear face of the grille 20 is provided a plug member 21 which is to be connected with the connector member 12 provided on the stereo body 10. The plug member 21 has a contact 21a corresponding to the contact 12a for obtaining 5 V electric power supply, a contact 21b corresponding to the contact 12b for data input and output, a contact 21c corresponding to the contact 12c for obtaining 8 V electric power supply, and an earth contact 21d corresponding to the earth contact 12d provided on the connector member 12. The contact 21a and contact 21b are connected to another micro-computer 25 which, in accordance with operating modes of the various pushbuttons 22, produces control signals for indicating various information such as time and a radio receiving frequency. Further, a display driver 26 controls the operation of the display 23 in accordance with a control signal fed from the micro-computer 25. In addition, an illuminating lamp 27 is connected to the contact 21c.

The grille 20 may be attached to the stereo body 10 by first pushing the rear left end portion of the grille 20 into the left side portion of the recess 11 of the stereo body 10, and then pushing the rear right end portion of the grille 20 into the right side portion of the stereo body 10. Meanwhile, the detecting switch 15 is abutted by the rear left end portion of the grille 20 so as to become in ON state, thereby detecting the attachment of the grille 20. Then, the micro-computer 19 feeds control data through the data output contact 12b to the grille 20.

After the attachment of the grille 20 to the stereo body 10, the connector member 12 provided on the stereo body 10 becomes engaged with the plug member 21, so that an electric power of 5 V is supplied through the contacts 21a and 12a to the micro-computer 25. After the micro-computer 25 performs a reset operation, the micro-computer 25 receives a control data which is fed through the contacts 12b and 21b from the micro-computer 19, thereby enabling the display driver 26 to perform proper operations in accordance with the control data fed thereto.

On the other hand, upon detachment of the grille 20 from the stereo body 10, the detecting switch 15 returns to OFF state. This OFF state is detected by the micro-computer 19 which at once stops feeding of the data to the contact 12b.

However, in a conventional car stereo having a detachable grille, the connector member 12 provided on the stereo body 10 and the plug member 21 provided on the grille 20 are constructed as shown in FIG. 11 which cause some problems as discussed hereinafter.

First, it is seen from FIG. 11 that said contacts 12a–12d are all in an exposed state. Since these contacts are formed of a kind of torsion spring, they have a low resistance to torsion and are easy to suffer from a deformation due to an external force in their lateral direction. Second, since the connector member 12 is engaged with the plug member 21 only when the grille 20 is attached to the recess 11 of the stereo body 10, if the attachment is performed in an inappropriate manner, an aberration is apt to occur while the contacts 12a–12d of the connector member 12 are being engaged with the corresponding contacts 21a–21d of the plug member 21. And, if an external force is unduly applied to the contacts 12a–12d on the connector member 12, the contacts 12a–12d will be deformed, hence causing an imperfect contact between the contacts 12a–12d of the connector member 12 and the contacts 21a–21d of the plug member 21.

Figure 3:
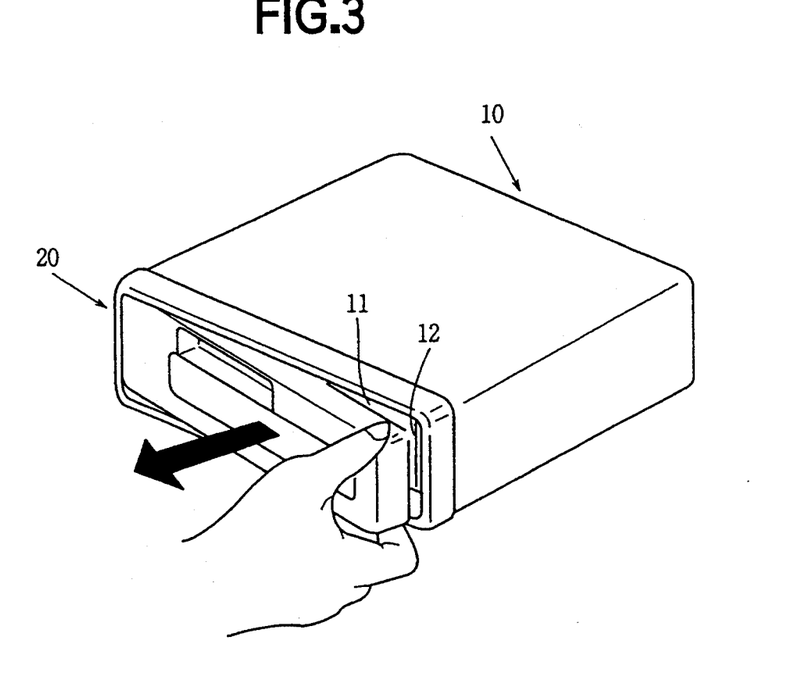
FIG. 3 is a perspective view showing the grille of FIG. 2 being detached from the stereo body.

Moreover, as shown in FIG. 3, since the contacts 12a–12d are in an exposed state after the grille 20 is released from the stereo body 10, some insulant substances such as oil is apt to be depositted onto the surfaces of the contacts due to an accidental touching. This also causes an imperfect contact between the contacts 12a–12d of the connector member 12 and the contacts 21a–21d of the plug member 21.

In addition, since the contacts 21a–21d of the plug member 21 are pressure-contacted by the contacts 12a–12d of the connector member 12, the vibration of a travelling motor vehicle will produce an external force applied on to the contacts, causing an aberration in the pressure-contact relationship and hence resulting in a deformation of the contacts which leads to a similar imperfect contact.

SUMMARY OF THE INVENTION

An object of the present invention is to solve the above-mentioned problems peculiar to the prior art and to provide a car stereo in which the above-noted imperfect contact may be exactly prevented.

According to the present invention, there is provided a car stereo having a stereo body including a connector member provided with various contacts, and a detachable grille including a plug member provided with various contacts corresponding to the contacts of the connector member, the connector member and the plug member being adapted to be engaged with each other, said car stereo comprising a plurality of separators formed on the connector member for separating said contacts provided on said connector member so as to render these contacts to be space apart with one another, a plurality of grooves formed on the plug member into which the separators formed on the connector member are inserted, said contacts provided on the connector member and said contacts provided on the the plug member being adapted to be electrically connected by the engagement of said separators of the connector member with said grooves of the plug member.

In an aspect of the present invention, each of the separators formed on the connector member has a height higher than that of each of said contacts provided thereon.

The other objects and features of the present invention will become understood from the following description with reference with the accompanying drawings.

DETAILED DESCRIPTION OF THE PREFERRED EMBODIMENTS

Figure 1:
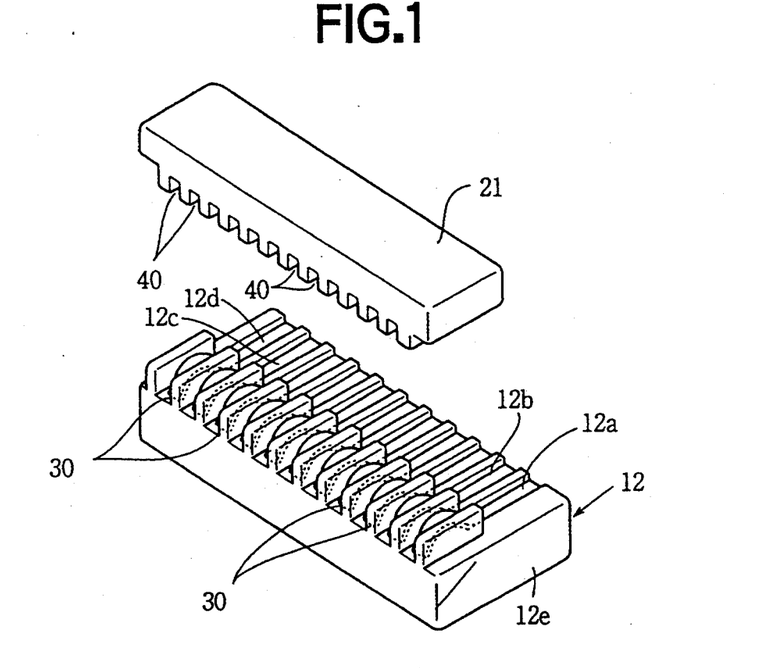
FIG. 1 is a perspective view showing a connector member and a plug member according to the present invention.
Figure 2:
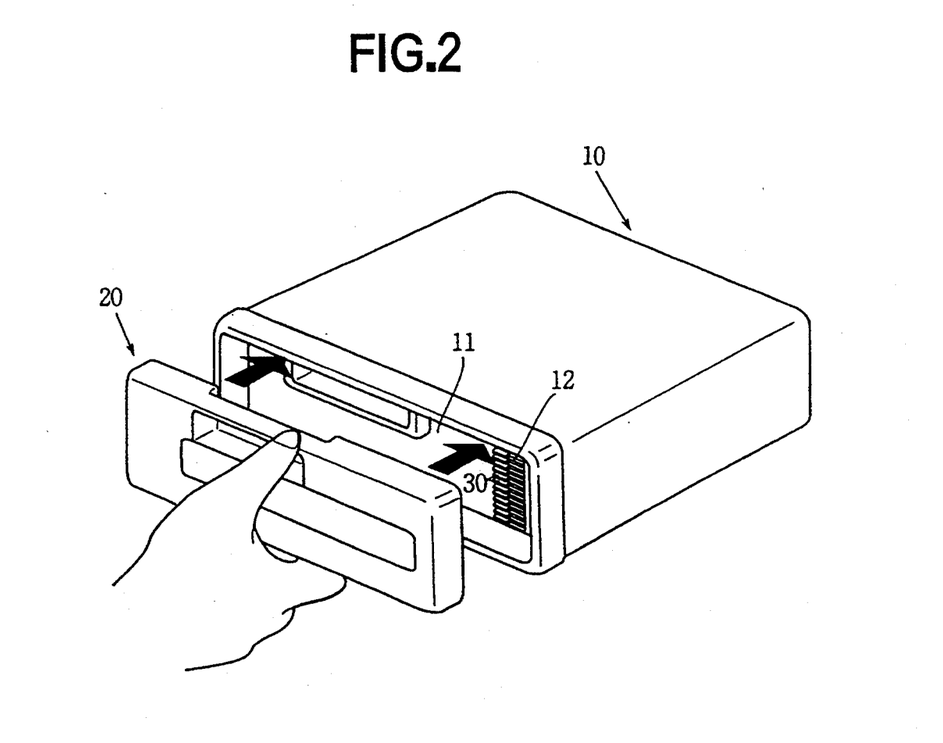
FIG. 2 is a perspective view showing a grille provided with the plug member of FIG. 1 being attached onto a stereo body provided with the connector member of FIG. 1.

Referring to FIGS. 1 and 2, FIG. 1 shows a connector member 12 and a plug member 21 according to the present invention, which are used in a car stereo comprising a stereo body 10 and a detachable grille 20. The connector member 12 is provided on the stereo body 10 of the car stereo, and the plug member 21 is provided on the grille 20 thereof.

As shown in FIG. 1, various contacts 12a–12d are provided on a connector body 12e of the connector member 12. The contacts 12a–12d are formed of a kind of torsion spring, and a plurality of separators 30 are formed parallel to one another in the longitudinal direction of the contacts. Each separator has a height higher than that of each of the contacts such that the contacts 12a–12d are prevented from touching even if the connector member 12 is accidentally touched by a person's hand.

The plug member 21 is provided with a plurality of grooves 40 corresponding to the separators 30 formed on the connector member 12, so that the separators 30 may be inserted into these grooves 40. The depth of each of the grooves 40 is set to be equal with the height of each separator 30. Therefore, when the plug member 21 is engaged with or disengaged from the connector member 12, the engagement or disengagement may be performed exactly with the wall portions of the grooves 40 being guided by the wall portions of the separators 30.

As shown in FIG. 2, the stereo body 10 is provided with the connector member 12 at a recess 11 thereof. The separators 30 of the connector member 12 are arranged in horizontal direction. On the other hand, the grooves formed on the plug member 21 attached on the rear face of the grille 20 are similarly arranged in the same horizontal direction, so that the separators 30 may be exactly inserted into the grooves 40.

Using the structure as described above, even if the grille 20 is pushed into the recess 11 of the stereo body 10 with only a small attention as to attachment, it is still easy for each separator 30 of the connector member 12 to be inserted into each groove 40 formed on the plug member 21. Thus, even before a complete engagement of the connector member 12 with the plug member 21 is reached, the contacts 12a–12d of the connector member 12 become pressure-contacted with the contacts 21a–21d of the plug member 21.

When a motor vehicle is travelling with the grille 20 mounted in the recess 11 of the stereo body 10, the engagement of the plug member 21 with the connector member 12 having the separators 30 inserted into the grooves 40, may adequately and exactly keep the contacts 12a–12d in a pressure-contacted condition without any vibration. Since the engagement of the plug member 21 with the connector member 12 is stable, an external force caused by the vibration of the vehicle does not have any undesired effect on contacts 12a–12d so long as the pressure-contacted state is maintained.

Referring to FIG. 3, when the grille 20 is to be detached from the recess 11 of the stereo body 10, a push button for detaching (not shown) is pressed to pop-out the right end portion of the grille 20. Since the movement of the pop-out is performed in a sliding manner, the plug member 21 may be smoothly disengaged from the connector member 12 with the wall portions of the grooves 40 being guided by the wall portions of the separators 30 in the lateral direction thereof. Therefore, the contacts 21a–21d provided on the plug member 21 are smoothly disengaged from the contacts 12a–12d provided on the connector member 12.

Figure 4:
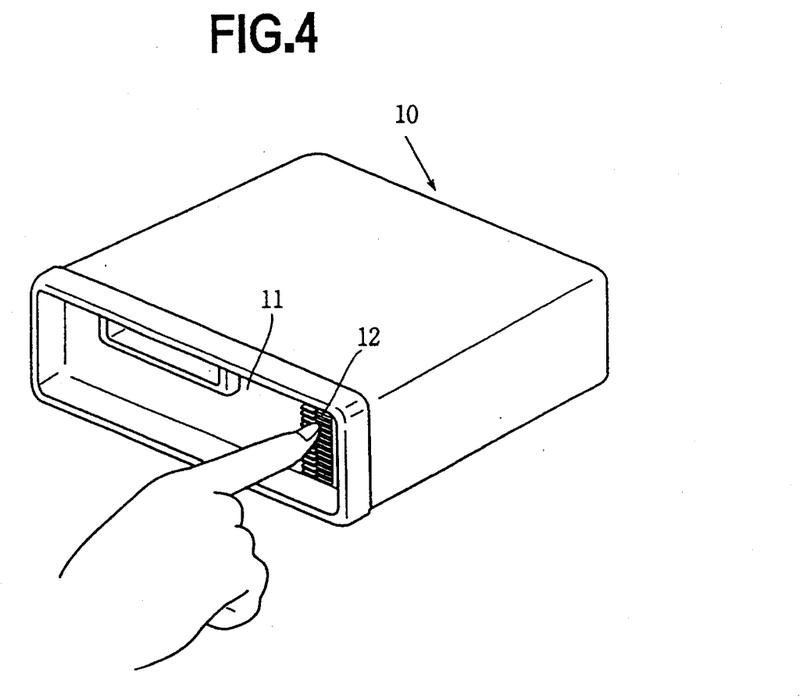
FIG. 4 is a perspective view showing a condition wherein exposed contacts of the connector member may be prevented from touching by separators.

Referring to FIG. 4, after the grille 20 has been removed from the stereo body 10, the contacts 12a–12d provided on the connector member 12 are all in an exposed state. However, since each of the separators 30 formed on the connector body 12e of the connector member 12 has a height higher to some extent than that of each of the contacts 12a–12d, the contacts 12a–12d may be protected from an accidental touching of a person's hand, thereby preventing undesired substance such as oil components from adhering to the contacts so as to avoid imperfect contact between the contacts 12a–12d and contacts 21a–21d.

Figure 5:
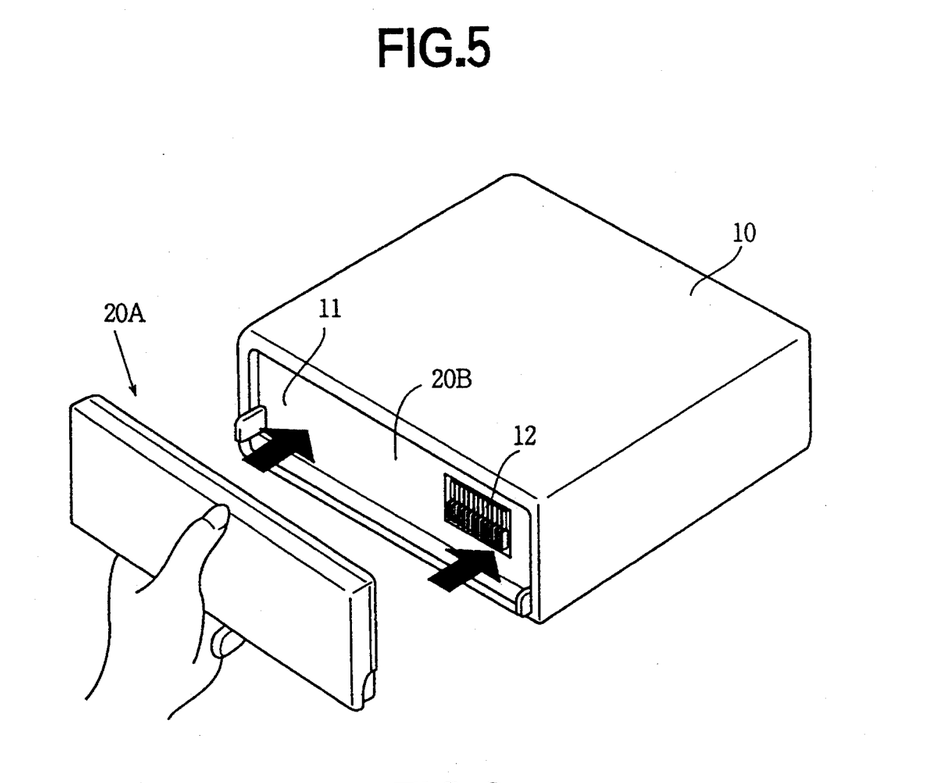
FIG. 5 is a perspective view showing a flap type of car stereo in which the connector member and the plug member of FIG. 1 are used.

FIG. 5 shows another embodiment where the connector member 12 and the plug member 21 of the present invention are used in a flap type of car stereo. As shown in FIG. 5, a grille 20A is attached to a recess 11 of a stereo body 10 through a flap member 20B pivotably mounted in the recess 11. In the flap type of car stereo of this embodiment, the connector 12 is provided in the recess 11 with the separators 30 arranged such that their longitudinal directions are in the vertical direction. Accordingly, the plug member 21 is provided on the rear face of the grille 20A with the grooves 40 arranged such that their longitudinal directions are in the same vertical direction.

When the grille 20A is to be attached to the stereo body 10, firstly the flap member 20B is rotated about the stereo body 10 so as to close on the stereo body 10. Then, the grille 20A is pushed into the recess 11 of the stereo body 10 with only a small attention as to attachment, each separator 30 of the connector member 12 is thus exactly inserted into each groove 40 formed on the plug member 21. After the grille 20A has been pushed into the recess 11 and just before a complete engagement of the connector member 12 with the plug member 21 is reached, the contacts 12a–12d of the connector member 12 become pressure-contacted with the contacts 21a–21d of the plug member 21.

When a motor vehicle is travelling with the grille 20A mounted in the recess 11 of the stereo body 10, the engagement of the plug member 21 with the connector member 12 having the separators 30 inserted into the grooves 40, may adequately and exactly keep the contacts 12a–12d under the pressure-contacted condition without any vibration. Since the engagement of the plug member 21 with the connector member 12 is stable, an external force caused by the vibration of the vehicle does not have any undesired effect on contacts 12a–12d so long as the pressure-contacted state is maintained.

Figure 6:
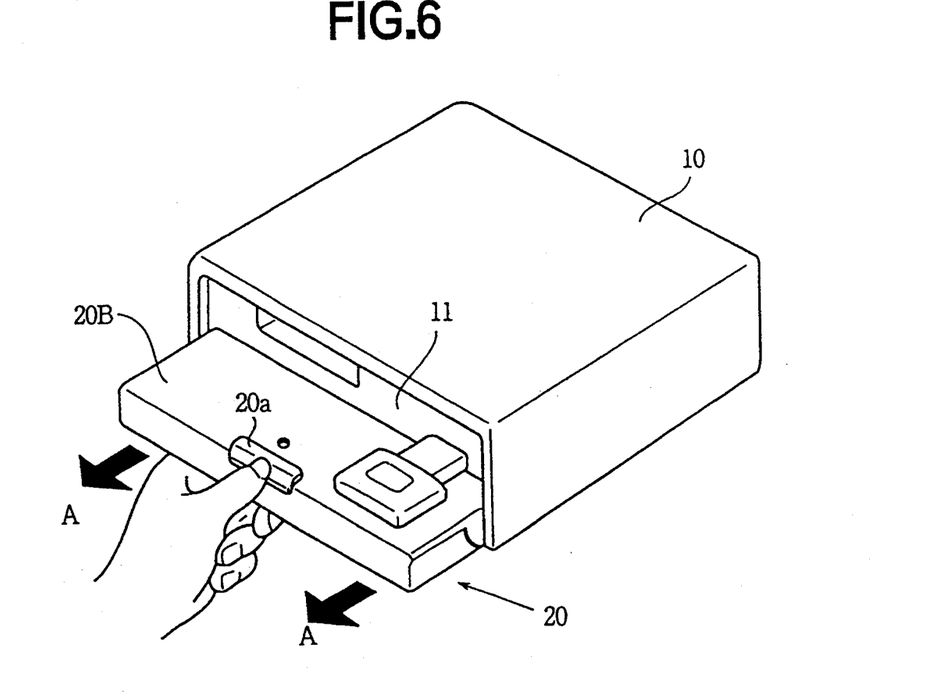
FIG. 6 is a perspective view showing a condition wherein the grille of FIG. 5 is being detached.

When the grille 20A is to be detached from the recess 11, a push button for detaching (not shown) is pressed to rotate the flap member 20B and the grille 20A to a horizontal position as shown in FIG. 6. Then, a detaching button 20a is pressed to release the grille 20A by pulling out in a direction shown by arrows A. Since the release movement is performed in a slinding manner in the horizontal direction at this moment, the plug member 21 may be smoothly disengaged from the connector member 12 with the wall portions of the grooves 40 being guided by the wall portions of the separators 30 in the longitudinal direction thereof. Therefore, the contacts 21a–21d provided on the plug member 21 are smoothly disengaged from the contacts 12a–12d provided on the connector member 12.

Figure 7:
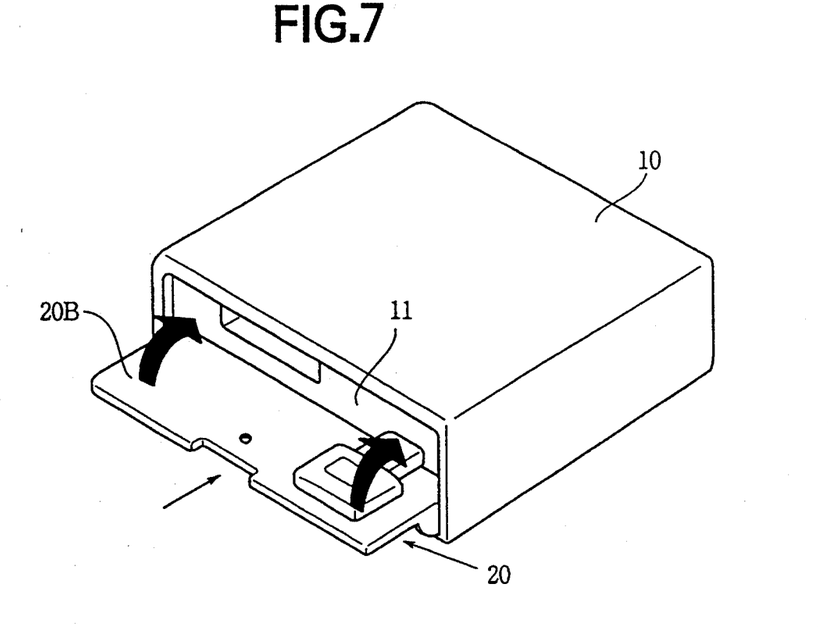
FIG. 7 is a perspective view showing a condition wherein the flap member of FIG. 5 is being returned to the closed position thereof.
Figure 8:
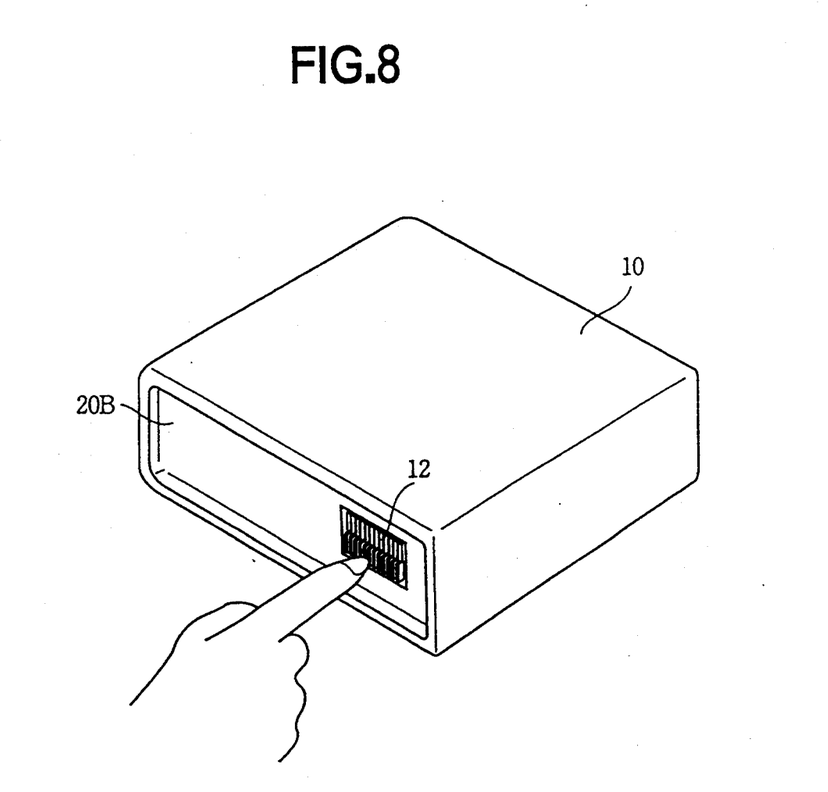
FIG. 8 is a perspective view showing a condition wherein exposed contacts of the connector member may be prevented from touching by separators.

After the grille 20A has been removed from the recess 11 of the stereo body 10, the flap member 20B is rotated back so as to be closed on the stereo body 10 as shown in FIGS. 7 and 8. This time, the contacts 12a–12d provided on the connector member 12 are all in an exposed state. However, since each of the separators 30 formed on the connector body 12e of the connector member 12 has a height higher to some extent than that of each of the contacts 12a–12d, the contacts 12a–12d may be protected from an accidental touching of a person's hand, thereby preventing undesired substance such as oil components from adhering to the contacts so as to avoid imperfect contact between the contacts 12a–12d and contacts 21a–21d.

In accordance with the present invention, each of the separators formed on the connector member has a height higher than that of each of the contacts provided thereon. By making the separators of the connector member to insert into the grooves of the plug members, the connector member provided on the stereo body will be engaged with the plug member provided on the grille, thus the contacts of the connector member become exactly engaged with the contacts of the plug member.

Using the connector member and the plug member according to the present invention, the contacts of the connector member may be engaged with the contacts of plug member after the connector member is easily engaged with the plug member. Thus, an undesired situation may be avoided where an external force is unduly applied to the contacts of the connector member, thereby preventing the deformation of these contacts. Further, when the grille is to be detached from the stereo body, the plug member may be easily disengaged from the connector member with the wall portions of the grooves being always guided by the wall portions of the separators in the lateral or longitudinal direction. Thus, the contacts provided on the plug member are properly disengaged from the contacts provided on the connector member without any vibration. Similarly, an undesired situation may be avoided where an external force is unduly applied to the contacts of the connector member, thereby preventing the deformation of these contacts.

Furthermore, since each of the separators has a height higher than that of each of the contacts on the connector member, and the contacts are separated from one another by these separators, even if the contacts of the connector member are in exposed state they may be protected from an accidental touching of a person's hand, thereby preventing undesired substance such as oil components from adhering to the contacts so as to avoid imperfect contact between the contacts of connector member and contacts of the plug member.

In addition, when a motor vehicle is travelling with the grille mounted on the stereo body, the engagement of the plug member with the connector, member having the separators inserted into the grooves, may exactly and adequately keep a stable engagement between the contacts of the connector member and the contacts of the plug member without any vibration. Since the engagement of the plug member with the connector member is stable, an external force caused by the vibration of the vehicle does not have any undesired effect on any of the contacts, thereby avoiding the deformation of these contacts.

While the presently preferred embodiments of the this invention have been shown and described above, it is to be understood that these disclosures: are for the purpose of illustration and that various changes and modifications may be made without departing form the scope of the invention as set forth in the appended claims.

What is claimed is:

1. A car stereo having a stereo body including a connector member provided with various contacts, and a detachable grille including a plug member provided with various contacts corresponding to the contacts on the connector member, the connector member and the plug member being adapted to be engaged with each other, comprising:

a plurality of separators formed on the connector member for separating said contacts provided on said connector member so as to render these contacts to be space apart with one another;

a plurality of grooves formed on the plug member into which the separators formed on the connector member are inserted; and said contacts provided on the connector member and said contacts provided on the the plug member being adapted to be electrically connected by the engagement of said separators of the connector member with said grooves of the plug member.

2. The car stereo according to claim 1, wherein each of the separators formed on the connector member has a height higher than that of each of said contacts provided thereon.

3. The car stereo according to claim 1, wherein said separators and said grooves are horizontally arranged with respect to the car stereo.

4. The car stereo according to claim 1, wherein said separators and said grooves are vertically arranged with respect to the car stereo.

* * * * *